April 15, 1930.   J. H. COHEN   1,754,669
HEATER
Filed Aug. 28, 1925
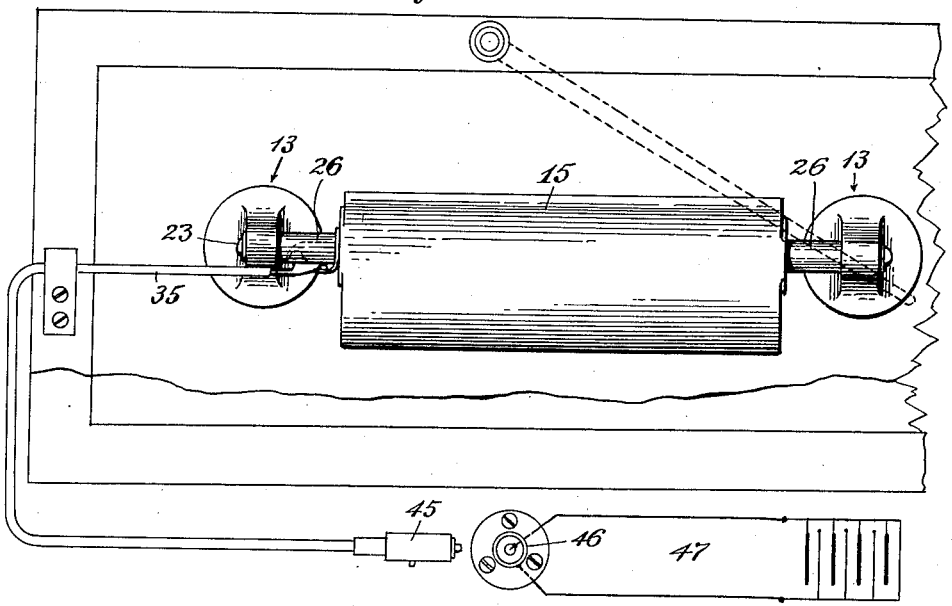
*Fig. 1.*
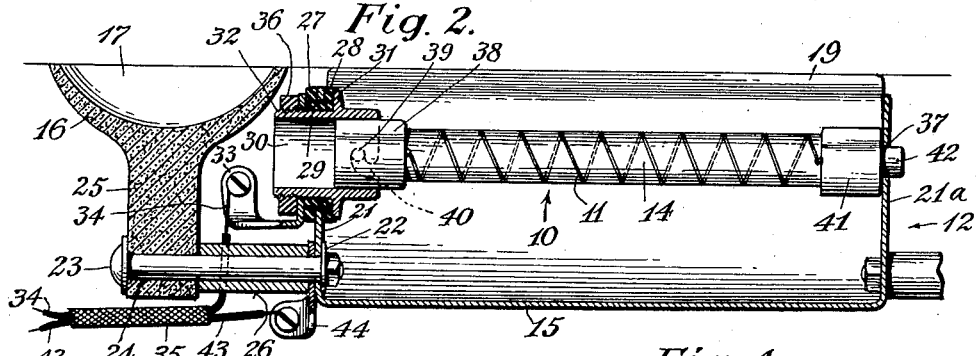
*Fig. 2.*
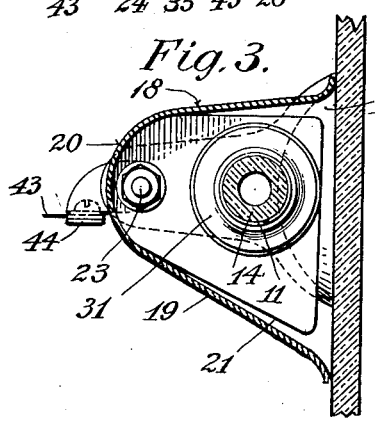
*Fig. 3.*
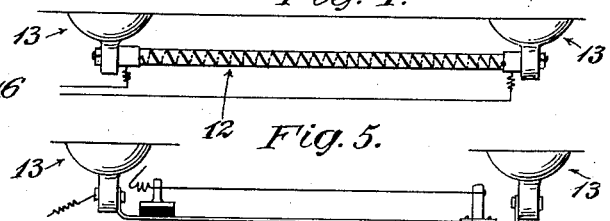
*Fig. 4.*
*Fig. 5.*
*Fig. 6.*
INVENTOR.
J. H. Cohen,
BY
ATTORNEYS.

Patented Apr. 15, 1930

1,754,669

UNITED STATES PATENT OFFICE

JOSEPH H. COHEN, OF BRIDGEPORT, CONNECTICUT

HEATER

Application filed August 28, 1925. Serial No. 53,005.

This invention relates to heating devices, and more particularly to devices adapted to be applied to windshields, windows, etc., of vehicles to melt ice and snow on either the inside or the outside of the glass and to prevent the formation of ice on the glass and to prevent condensation of moisture on the inside of the glass, and to a method for accomplishing these results.

An object of this invention is to provide a windshield heater of such size and shape that it will not obstruct the vision of the operator or driver when in position to heat a portion of the glass in the line of vision of the operator or driver.

Another object is to provide a windshield heater which may be attached directly to the glass of the windshield and which will require no other support when in operation.

A further object is to provide a windshield heater which can be easily and quickly applied to or removed from the windshield without the use of tools or other appliances.

A further object is to provide a windshield heater which may be easily moved from place to place on the windshield so that while the area directly warmed by the heater may be relatively small, yet any desired part of the windshield may be warmed by merely moving the heating device to that particular part.

A still further object is to provide a windshield heater having a heat reflector which may be regulated to vary the heating effect of the heater upon the glass.

And a still further object of the invention is to provide a heater for car windows which may be made at relatively small cost and which is efficient in operation and durable.

The invention further provides a method of heating vehicle windows whereby only a small part of the window is blocked by the application of a heating device.

Other objects will hereinafter appear.

In the accompanying drawings, Figure 1 is a view of a fragment of a windshield showing the heater of the present invention as mounted on the windshield and showing its connection to a conventional source of current supply.

Fig. 2 is a longitudinal sectional view of the heater of the present invention showing therein an electric heating element.

Fig. 3 is a side sectional view of the form of the invention shown in Fig. 1.

Fig. 4 is a longitudinal sectional view of a modification of the device shown in Figs. 1, 2 and 3.

Fig. 5 is a view similar to Fig. 4 showing another modification of the device shown in Figs. 1, 2 and 3.

Fig. 6 is a view similar to Fig. 1 showing a device having a curved form.

In cold weather during rain or snow, great difficulty is experienced in driving motor vehicles, since in spite of the use of windshield-wipers, ice frequently forms on the windshield directly in front of the driver and so impedes his vision that he cannot proceed in safety unless the windshield is opened or until the ice has been removed. Many accidents have occurred because of the vision of the driver being impaired in this way.

This difficulty is very serious especially in cases where the windshield cannot be opened, either because it is frozen or because it was not made to be opened, for then the driver must stop and melt the ice from the windshield in some way. Even where the windshield can be opened, a driver who must of necessity wear eye-glasses, cannot safely proceed, for the snow or rain driving through the open windshield falls upon his eye-glasses and soon impedes his vision.

Notwithstanding the seriousness of the conditions above outlined, no satisfactory means has heretofore been provided to obviate the difficulty. While attempts have been made in this direction, the proposed devices are permanently supported adjacent the windshield and impair the driver's vision somewhat at all times, even when not needed, and are so large as to materially limit the driver's vision when in use, and even if it could be removed when not in use.

The device of the present invention, however, neither materially restricts the driver's vision, nor is it mounted so as to always be in range of the driver's vision. Instead, it is quickly and easily attached to and removed from the windshield without the use of tools. Moreover, it may be easily moved from place to place on the windshield as conditions demand.

The device may be made extremely small because it has been found that it is not necessary to directly heat a large portion of the windshield immediately in front of the driver, and that directly heating only a relatively small portion of the windshield is sufficient since the heat is conducted to the glass over a wide area and since the water which it heats, melts the ice and keeps the glass warm as it flows down over the area through which the driver looks.

Moreover, the device is adapted to be applied to the inside surface of the glass and may be so located that it is adjacent the portion of the glass covered by the range of movement of the windshield wiper, so warming this portion as to prevent freezing.

In the physical embodiments of the invention, herein disclosed as exemplary thereof, the device of the present invention comprises a heating unit 10 which may be constituted by a coil of high resistance wire 11, as shown in Figs. 1 to 4 or may be one or more uncoiled lengths of resistance wire as in the form shown in Fig. 5. The heating unit 10 is supported on a rigid or semi-rigid frame 12 which has preferably at its end, supports 13 by means of which the device may be directly attached to the glass of the windshield or other window of a vehicle.

The frame 12 may consist solely of a porcelain or other tube or rod 14 secured in the support 13 upon which the heating unit 10 is mounted, as shown in Fig. 4 or it may consist solely of a sheet-metal casing 15 as shown in Fig. 5 in which instance the casing concentrates the heat of the heating unit 10 to a zone on the glass which its edges define. The casing 15 is preferably curved and has its inside surface polished to deflect and reflect the heating unit 10 against the surface of the glass, and to shield the glow of the wire 11 from the eyes of the occupants of the car.

Preferably, however, the heating unit 10 is mounted upon the porcelain or other tube or rod 14 and this is mounted in the casing 15 which is secured to the support 13, as shown in Figs. 1, 2 and 3. With this arrangement, the heating unit 10 is securely supported and protected by the rod 14, and the heating unit and rod are securely mounted and protected against damage by the casing 15, which has the same deflecting and shielding functions that it has in the form shown in Fig. 5.

So that it may be quickly attached to and removed from a windshield, etc., and so that its position may be easily and quickly changed as conditions or desires of the user dictate, the device preferably comprises two supporting devices 13, one at each end of the device, in the form of suction cups 16 of relatively soft rubber adapted when firmly pressed against the glass of the windshield to be so deformed as to expel a substantial amount of air in the pockets 17 thereof. Hence, when the cup by its own resiliency returns or tends to return to its normal shape, the suction so produced within the pocket 17 will result in the device being firmly held in the position in which it was placed on the glass until forcibly removed by the user.

The suction cups may be made of tacky material to prevent the leakage of air to the pockets 17 when adhering to the glass, and to further insure the same result, the lips of the cups may be slightly moistened before the cups are applied to the glass.

Referring now in detail to the form shown in Figs. 2 and 3, the casing 15 comprises a single piece of sheet-metal having an upper curved portion 18, a lower curved portion 19 and a central curved portion 20 together forming in section a spiral curve, and ends 21 and 21ª bent at right-angles to and solid with the curved portion 20. The ends 21 and 21ª substantially close the ends of the casing as shown in Fig. 3 and, in addition to serving as a support for the various parts of the device, tend to confine the air heated by the heating unit 10 within the casing.

The ends 21 and 21ª are provided with holes 22 through which bolts 23, located in holes 24 in lugs 25 provided in the suction-cups 16, pass to securely fasten the casing to the suction-cups, spacing sleeves 26 being placed between the lugs 25 of the suction-cups and the ends 21 and 21ª. The entire assemblage is such that the casing 15 is rigidly and securely held to the suction-cups at both of its ends.

Mounted in the end 21 and electrically insulated therefrom by fibre washers 27 and 28 and a fibre sleeve 29 is a socket 30 having a flange 31 at its inner side and a screw threaded portion 32 at its outer side which is adapted to receive a lug 33 soldered to a wire 34 of a cable 35 and also a nut 36 which, when tightened, securely binds the socket 30 to the end 21 and electrically connects the wire 34 to the socket. The end 21ª is provided directly opposite the socket 30 with a hole 37.

The rod 14 of the heating unit 10 at one end is provided with a metallic ferrule or cap 38 clinched to the rod and adapted to fit the socket 30 and having pins 39 to enter and lock in bayonet slots 40 provided in the socket 30. One end of the heating wire 10 is soldered or otherwise electrically connected to the ferrule 38 so that current from the wire 34 may pass to the heating wire 11.

At its other end, the wire 14 of the heating unit 10 is provided with a ferrule 41 clinched to the rod and having a metallic boss or pin 42 adapted to fit in the hole 37 provided in the end 21ª of the casing 15. This ferrule 41 has soldered or otherwise secured to it, the end of the resistance wire 11 opposite to that connected to the ferrule 38, so that current flowing through the resistance wire 11 passes through the ferrule 41, boss 42 and casing 15 to a wire 43 soldered to a lug 44 interposed between the end 21 of the casing and the sleeve 26 and so electrically connected to the casing. The wire 43 constitutes the mate of the wire 34 in the cable 35 which leads to a suitable source of current.

To mount the heating unit 10 in the casing 15, the boss 42 is inserted in the hole 37 of the end 21ª which is then sprung outwardly, being only connected to the main portion of the casing, adjacent the central portion 20, while the ferrule 38 is slipped into the socket 30 with the pins 39 in the bayonet slots 40. With the parts in these positions, the spring action of the end 21ª against the shoulder 44 of the ferrule 41 maintains the latter in electrical engagement with the casing and holds the ferrule 38 in the socket 30 against accidental movement and until, by the application of sufficient force by the user, the end 21ª is again sprung outwardly to permit the removal of the heating unit.

This invention, therefore, it will be noted, provides a removable heating unit which may be easily and quickly removed from the casing 15 to make a replacement in the event that the resistance wire 11 burns out or the wire or rod is accidentally broken.

The cable 35 which is connected to the device as above described is made sufficiently long so that its other end, which is provided with an Ediswan plug 45 may be inserted in the dash lamp socket 46 or other electrical unit on the dash board 47 of the vehicle, while the device may be placed at any desired point upon the windshield.

The ends 21 and 21ª are made sufficiently short so that the casing 15 may move toward the glass while the suction-cups are being depressed to expel the air therefrom without blocking this movement by engaging the glass, and for the same reason, the upper curved portion 18 and the lower curved portion 19 are so arranged as to yield during the depressing movement and remain in engagement with the glass upon the subsequent outward movement of the device when the pressure is relaxed. To permit this, the portions 18 and 19 are not made solid with the ends 21 and 21ª but are cut therefrom at 48 as shown in Fig. 3.

When the weather conditions do not require the use of the device of this invention, it may be removed from the windshield by simply pulling on the suction-cups, and it then may be stored away in any suitable place in the car. The windshield is then unobstructed by any permanent attachment, and when weather conditions necessitate the use of the device of the present invention, it does not seriously limit the driver's range of vision since it may be made very narrow. Since the device is portable, it can be made to assume any desired position on the windshield. In the forms of the invention above described, the frame 12 is shown as being straight. In this case, the water flowing down the outside of the glass in case of rain or snow, and being heated, will melt the ice which forms upon the windshield below the device itself, along a curved line, since the heat is more intense at the center of the device than at the end. Consequently, when the device is placed in the position as shown in Fig. 1, the zone kept clear by the heating device will be substantially embraced within the outside radius of the windshield wiper, whose function then, is to keep the glass free of surplus water.

However, if it is desired that the zone cleared on the windshield by the heater of this invention be of a different shape, the frame 12 may have a different shape. For instance, if the frame 12 is made to curve upwardly, as shown in Fig. 6, the zone cleared will have a substantially straight line at its lowermost portion.

Since the curved portions 18 and 19 are movable with relation to the curved portion 20 and ends 21 and 21ª, either or both of the former may be permanently bent away from its normal glass-engaging position to permit the escape of the heated air in the casing 15.

Variations and modifications may be made within the scope of this invention, and portions of the improvements may be used without others.

Having now described the invention, what is claimed as new and for which it is desired to obtain Letters Patent is:

1. An anti-freezing device for glass vehicle windows comprising a heater, and suction means for detachably securing said heater directly on the glass of such windows.

2. An anti-freezing device for glass windows of motor vehicles comprising a casing, a heating unit mounted therein, and suction-cups carried by the casing and adapted to be applied to the glass of the window to hold the device thereon in any desired position or place.

3. A heating device for glass windows of motor vehicles comprising a casing, suction cups adapted to attach the casing to the glass of such windows, and a heating unit within said casing, the latter having flexible portions adapted to yieldably engage the glass and confine the heat in the casing to the portion of the glass covered by the same.

4. A heating device for glass windows of motor vehicles comprising a supporting frame, sockets in the frame, and an electric heating unit mounted in the sockets for quick removal and attachment.

5. A heating device for glass windows of motor vehicles comprising a supporting frame, an electric heating unit removably mounted in the frame, an electric plug on the heating unit having a pin, and an electric bayonet-slot socket on the frame and adapted to receive and electrically connect with the plug on the heating unit.

6. A heating device for glass windows of motor vehicles comprising a supporting frame, an electric heating unit removably mounted in the frame, a plug on the electrical heating unit electrically connected to the electric heating unit, a socket on the frame adapted to receive and electrically connect with the plug of the heating unit, said socket being electrically insulated from the casing and electrically connected to a source of current supply, a plug in electric contact with the other end of the heating unit and adapted to be electrically engaged with the casing, and means adjacent said socket for electrically connecting the casing to the source of current supply.

7. As a new article of manufacture, a heating unit for electrically operated wind-shield warmers comprising a substantially straight rod of refractory material; a heating wire wound on said rod in the form of a helix; a metal contact ferrule secured to one end of said rod and to which one end of said contact wire is electrically connected; and another metallic contact ferrule secured to the other end of the rod to which the other end of the heating wire is electrically connected, said ferrules being adapted to contact with suitable contact means on a holder which may be provided for the heating element.

8. A heating attachment for windshields, comprising an elongated electrical heating element, a reflector at the side of the heating element remote from the windshield said reflector extending below and above said heating element, means including a suction cup at each end of the reflector for securely fastening the attachment to a windshield, and means for connecting the heating element to a source of electricity.

Signed at Bridgeport, in the county of Fairfield, and State of Connecticut, this 27th day of August, 1925.

JOSEPH H. COHEN.